United States Patent
Zhu et al.

(10) Patent No.: US 9,502,061 B1
(45) Date of Patent: Nov. 22, 2016

(54) DATA STORAGE DEVICE OPTIMIZATION BASED ON ADJACENT TRACK INTERFERENCE

(71) Applicant: Seagate Technology LLC, Cupertino, CA (US)

(72) Inventors: Wenzhong Zhu, Apple Valley, MN (US); Alfredo Chu, Prior Lake, MN (US); SiewKin Chow, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/846,074

(22) Filed: Sep. 4, 2015

(51) Int. Cl.
  *G11B 5/55* (2006.01)
  *G11B 20/10* (2006.01)
  *G11B 5/00* (2006.01)

(52) U.S. Cl.
  CPC ....... *G11B 5/5547* (2013.01); *G11B 20/10453* (2013.01); *G11B 2005/0021* (2013.01); *G11B 2220/2525* (2013.01)

(58) Field of Classification Search
  CPC . G11B 2220/2525; G11B 7/00; G11B 27/36; G11B 20/10453; G11B 20/12; G11B 5/09; G11B 5/596; G11B 5/59605; G11B 5/012; G11B 7/1263; G11B 5/5547; G11B 29/10305; G11B 20/0009; G11B 20/1238; G11B 5/746; G11B 13/026; G11B 5/035; G11B 20/1049; G11B 20/10305
  USPC .......... 369/13.11, 44.11; 360/31, 55, 48, 51, 360/46, 77.04, 77.06, 77.08
  See application file for complete search history.

(56) References Cited

U.S. PATENT DOCUMENTS

| | | | |
|---|---|---|---|
| 5,600,500 | A | 2/1997 | Madsen et al. |
| 5,774,285 | A | 6/1998 | Kassab et al. |
| 6,178,054 | B1 | 1/2001 | Wakefield |
| 6,181,493 | B1 | 1/2001 | Wakefield |
| 7,170,700 | B1 | 1/2007 | Lin et al. |
| 7,522,366 | B2 | 4/2009 | Mettler |
| 7,567,397 | B2 | 7/2009 | Lu |
| 7,567,400 | B2 | 7/2009 | Cheng |
| 7,738,208 | B2 | 6/2010 | Kim et al. |
| 7,839,588 | B1 | 11/2010 | Dang et al. |
| 8,089,720 | B2 | 1/2012 | Urakami et al. |
| 8,102,613 | B2 | 1/2012 | Duan et al. |
| 8,331,053 | B2 | 12/2012 | Hobbet |
| 8,467,144 | B2 | 6/2013 | Lim et al. |
| 8,705,193 | B2 | 4/2014 | Hirose |
| 8,711,499 | B1 | 4/2014 | Desai et al. |
| 8,780,487 | B2 | 7/2014 | Park et al. |
| 8,867,161 | B2 * | 10/2014 | Emo ................. G11B 20/1217 360/58 |
| 8,879,188 | B1 | 11/2014 | Chia et al. |
| 8,913,341 | B1 | 12/2014 | Jury et al. |
| 8,922,925 | B1 | 12/2014 | Coker et al. |
| 9,001,442 | B2 | 4/2015 | Park et al. |
| 9,025,264 | B1 | 5/2015 | Desai et al. |
| 2015/0332725 | A1 * | 11/2015 | Rausch ................ G11B 7/1267 369/13.26 |

* cited by examiner

*Primary Examiner* — Ali Neyzari
(74) *Attorney, Agent, or Firm* — Cesari & Reed, LLP; Kirk A. Cesari

(57) ABSTRACT

Systems, devices, processes, and methods of optimizing a data storage device based on adjacent track interference (ATI) are presented. ATI can be detected by writing a specific track of a disc a number of times and measuring a bit error rate (BER) of an adjacent track. In addition, more accurate in-field simulations of ATI can be achieved by seeking to another track, such as an adjacent track, in-between each write to the specific track. Further, in a heat-assisted magnetic recording (HAMR) device, a laser bias control can be implemented during at least one of the seeks to calibrate a laser in-between each write. Even further, the seeks may be anticipatory track seeks (ATS).

20 Claims, 8 Drawing Sheets

DATA STORAGE DEVICE OPTIMIZATION BASED ON ADJACENT TRACK INTERFERENCE

SUMMARY

In certain embodiments, an apparatus may include a write head adapted to write multiple data tracks of a data storage disc, and a controller coupled to the write head and configured to perform a calibration process. The calibration process may include: seeking the write head to an adjacent track of a target track, then, after the seek to the adjacent track, seeking the write head to the target track and writing the target track. The calibration process may also include repeating seeking to an adjacent track and writing the target track until a threshold number of writes to the target track have been reached. After the threshold number of writes are reached, an error rate of at least one of the adjacent tracks can be measured, and a setting corresponding to the data storage disc based on the error rate can be determined.

Further, a device may include a circuit adapted to couple to a write head corresponding to a data storage medium having multiple tracks for data storage, the circuit configured to perform a calibration process corresponding to the data storage medium. The calibration process may include: seeking to an adjacent track adjacent to a target track; seeking to the target track; writing the target track; repeating seeking to the adjacent track, seeking to the target track, and writing the target track until a threshold number of writes are met; after the threshold number of writes are met, measuring an error rate of at least one of the adjacent tracks; and determining an adjacent track interference threshold corresponding to the data storage medium based on the error rate.

In certain embodiments, a memory device storing instructions that, when executed, cause a processor to perform a method including performing a target track write process. The target track write process can include: seeking a write head of a data storage device to an adjacent track to a target track; seeking the write head to the target track; writing the target track; repeating the target track write process until the target track has been written a number of times; and after the target track has been written a number of times, determining a configuration of the data storage device from a measurement of at least one of the adjacent track.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a data storage device or data storage device test system. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
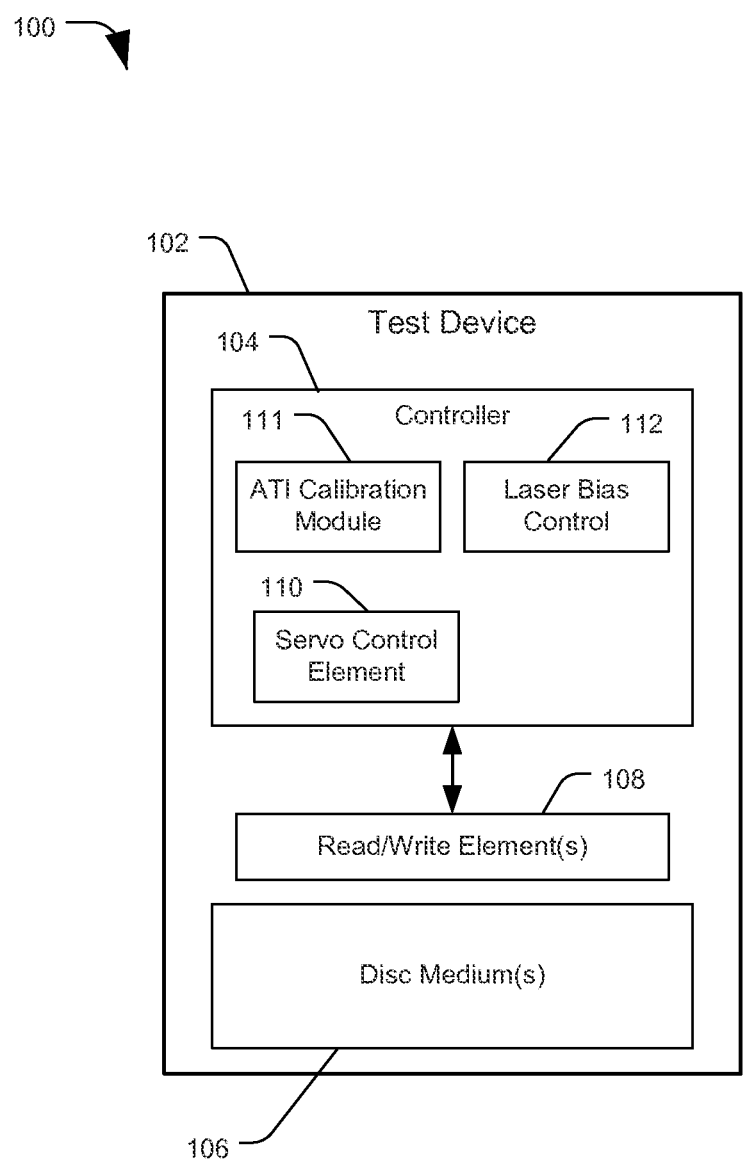
FIG. 1 is a diagram of a system for data storage device optimization based on adjacent track interference, in accordance with certain embodiments of the present disclosure.

Referring to FIG. 1, a system of data storage device optimization is shown and generally designated 100, in accordance with certain embodiments of the present disclosure. The system 100 can include a disc test device 102, which may include a controller 104, a read/write element 108 (sometimes referred to as a head or transducer), and an attachment mechanism (not shown), such as a spindle with a disc clamp, to receive one or more disc data storage mediums 106. In some embodiments, the read/write element 108 may include one or more transducers such as read head elements, write head elements, or both. The read/write element 108 may also include one or more laser emitters, sliders, air bearing surfaces, or other components. The read/write element 108 may be mounted on a rotatable arm and configured to traverse a surface of the disc medium 106 during read and write operations.

The disc test device 102 may perform testing and certification processes and operations on the disc medium(s) 106. The disc test device 102 may use controller 104 to control the movement and operation of the read/write element 108 relative to the disc medium(s) 106. The controller 104 may direct the read/write element 108 to move to a desired position over a recording surface of the disc medium 106 and to read data from or record data to the disc medium 104. For example, the read/write element 108 may include a read head configured to detect a magnetic field from a disc medium 106, and a write head configured to generate a magnetic field to change a magnetic polarity of one or more data regions of the disc medium 106. A servo control element 110 may control the positioning and movement of the read/write element 108 relative to the disc medium(s) 106.

In some embodiments, the read/write element 108 may include a laser emitter, such as in heat-assisted magnetic recording (HAMR) devices. The controller 104 may include a laser bias control 112, which may adjust an amount of current directed to the laser emitter or otherwise control the intensity or strength of the laser emitted from the laser emitter. The parameters of the laser may determine an area of the disc medium 106 influenced by a write element of the read/write element 108 (e.g. the recording width of a data track being written).

Controller 104, servo control element 110, and laser current control element 112 may include one or more circuits, processors, data channels or other elements configured to perform the described functions. In some embodiments a memory device may store computer readable instructions (computer program code) that, when executed, cause the controller 104, servo control 110, or laser current control 112 to perform the functions and processes described herein.

The disc test device 102 may be adapted to execute an ATI calibration module 111, which can include firmware, circuits, or a combination thereof, to perform a calibration or certification process as described herein to test adjacent track interference (ATI) and to configure a disc drive based on the test results. For example, a device may select or modify a threshold to trigger a directed offline scan (DOS) of a disc portion based on a determined bit error rate (BER) of one or more adjacent written tracks (e.g. "N+1" and "N−1"). The device may perform a test including seeking to a first track adjacent ("N+1") to the target write track, and then seeking to a second adjacent track ("N−1") also adjacent to the target write track. Seeking to each of the adjacent tracks and then writing the target write track can alternately repeat for a number of writes (e.g. hundreds of writes) each. The BER of at least one of the adjacent tracks can then be determined and the threshold can be selected based on the determined BER.

Figure 2:
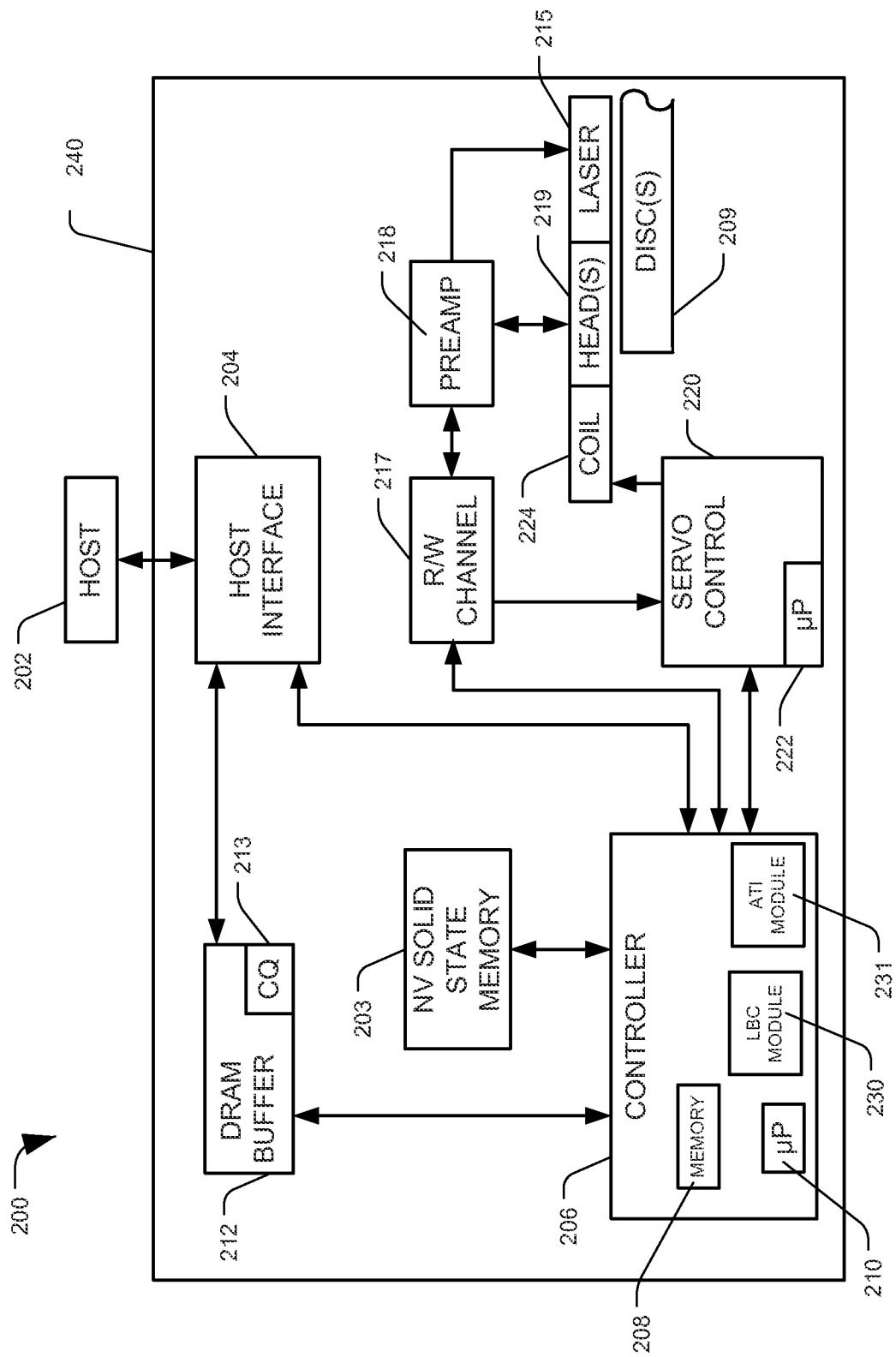
FIG. 2 is a diagram of a system for data storage device optimization based on adjacent track interference, in accordance with certain embodiments of the present disclosure.

Referring to FIG. 2, a diagram of a system for data storage device optimization based on adjacent track interference is shown and generally designated 200, in accordance with certain embodiments of the present disclosure. Specifically, FIG. 2 provides a functional block diagram of an example data storage device (DSD) 240 and host 202. The DSD 240 may be the test device 102 shown in FIG. 1. The DSD 240 may be hard disc drive (HDD), a hybrid solid state hard drive (SSHD), or other type of storage device.

The DSD 240 can include one or more data storage mediums, such as one or more disc(s) 209 or nonvolatile (NV) solid state memory 203. Additional memory can also be included, such as a volatile memory like dynamic random-access memory (DRAM) or static random access memory (SRAM), and the non-volatile memory may be Flash memory. The memory 203 can function as a cache and store recently or frequently read or written data, or data likely to be read soon, or may function as an additional main store. A DSD 240 containing multiple types of nonvolatile storage mediums, such as a disc(s) 209 and NV solid state memory 203, may be referred to as a hybrid storage device.

In some embodiments, the DSD 240 can communicate with a host device 202 via a hardware and firmware-based interface circuit 204. The interface 204 may comprise any interface that allows communication between a host 202 and a DSD 240, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 204 may include a connector (not shown) that allows the DSD 240 to be physically removed from the host 202. In some embodiments, the DSD 240 may have a casing or housing containing the components of the DSD 240, or the components of the DSD 240 may be attached to the housing, or a combination thereof.

The DSD 240 may include a buffer 212, which may be volatile or nonvolatile memory, and a command queue 213, where the buffer 212 can temporarily store data during read and write operations, and the command queue (CQ) 213 can temporarily store multiple pending operations pending execution. Commands arriving over the interface 204 may automatically be received in the CQ 213 or may be stored there by controller 206, interface 204, or another component.

The DSD 240 can include a programmable controller 206, which can include associated memory 208 and processor 210. In some embodiments, the DSD 240 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals to the R/W channel 217. A servo control circuit 220 may use servo data to provide an appropriate current to the coil 224, which may be a voice coil motor (VCM), to position the head(s) 219 over a desired area of the disc(s) 209. The controller 206 can communicate with a processor 222 to move the head(s) 219 to the desired locations on the disc(s) 209 during execution of various commands, such as from the command queue 213.

In some embodiments, the DSD 240 may include a laser emitter 215 and a laser bias control (LBC) module 230. A "module" may be one or more physical components of a computing device (e.g., circuits) configured to perform a particular task or job, or it may be a firmware program or code that, when executed, causes a processor to perform the particular function, task, or job, or may be a combination thereof. The laser emitter 215 may be located on a rotating arm controlled by the coil 224 and proximate to or incorporated into the head(s) 219. The laser emitter 215 may generate a laser to heat a portion of the disc(s) during write operations, thereby changing the magnetic coercivity to facilitate the head(s) 219 in setting a magnetic field. The LBC module 230 may control the power applied to the laser 215, which can modify the strength of the laser. A stronger laser can heat a larger area of the disc(s) 209, which in turn can increase an area of influence or "write width" of a recording head. For example, a lower power laser may produce a narrow write track, while a high power laser may produce a wide write track. The LBC module 230 may adjust a current of the laser emitter 215 based on control signals from, e.g., the controller 206 or the servo control 220. In some embodiments, the LBC module 230 may be located in or executed by the controller 206, at the servo control 220, by a separate circuit, or any combination thereof.

In some embodiments, a problem with the laser 215 self-heating may arise when continuously writing using the laser 215 for heat-assisted magnetic recording (HAMR). During HAMR writes, the laser diode heats itself and leads to a drop in the optical output of the laser 215. To help with this problem, the servo control 220 can implement a process called laser bias control (LBC). LBC can help reduce the laser self-heating by implementing the following when the head 219 performs a seek corresponding to a write command, the laser 215 can be turned on and the laser output can be measured using a photodiode (not shown). A control loop circuit of the laser 215 can adjust the bias current until an acceptable output power of the laser 215 is attained. Typically, LBC can be completed within the time it takes for one seek to occur. In addition, LBC can be completed within the time it takes for an Anticipatory Track Seek (ATS) to occur, for example, when seeking to an adjacent track.

Thus, the DSD 240 may be adapted to perform a calibration or certification process as described herein to test ATI and to configure the DSD 240 based on the test results. For example, the DSD 240, such as via controller 210, may select a threshold to trigger a DOS of one or more tracks of the disc(s) 209, where the threshold may be based on a determined bit error rate (BER) of one or more tracks adjacent to a target track ("N"). The DSD 240 may perform a test including seeking (i.e. positioning) the head 219 over a first track adjacent ("N+1") to the target track, then seeking the head 219 over the target track and writing the target track. Then, the DSD 240 may seek the head 219 over a second adjacent track ("N-1"), which is also adjacent to the target track, then seek the head 219 over the target track and write the target track. Seeking to each of the adjacent tracks and then writing the target track can alternately repeat for a number of writes to the target track (e.g. hundreds of writes). After the target track has been written a number of times, the BER of one or both (or more adjacent tracks such as tracks adjacent to the adjacent tracks) of the adjacent tracks can be determined and the threshold can be selected based on the determined BER.

In some embodiments of an ATI test, the controller 206 can implement an LBC process during each track seek after each write. That is, an LBC process can be performed when seeking to the first adjacent track or the second adjacent track. This can lead to an improved laser output during the ATI test. Thus, the writes to the target track may more accurately depict how the drive 240 may function during field use or testing by a customer.

Figure 3:
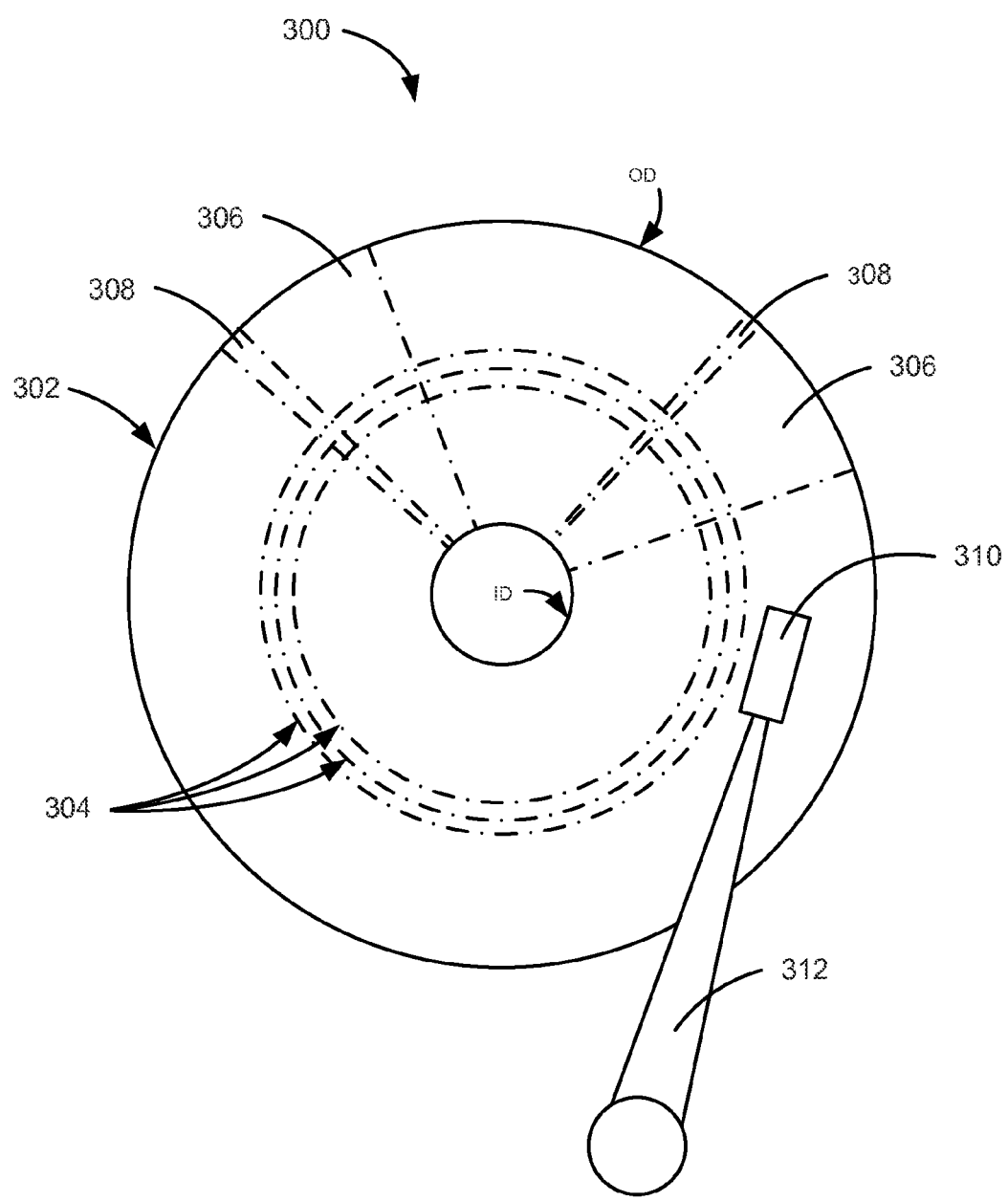
FIG. 3 is a diagram of a system for data storage device optimization based on adjacent track interference, in accordance with certain embodiments of the present disclosure.

Referring to FIG. 3, a diagram of a system for data storage device optimization based on adjacent track interference is shown and generally designated 300, in accordance with certain embodiments of the present disclosure. The system 300 may be incorporated into the system 100 or the system 200. A data storage device, such as a hard disc drive or hybrid drive, may have one or more discs 302 having tracks 304 for storing data. The tracks 304 may be arranged on the disc 302 in a substantially concentric pattern. The disc 302 may include an inner diameter (ID) of the disc and an outer diameter (OD) of the disc. Each track 304 may be divided into a number of wedge-shaped servo sectors 306 (or servo wedge), and each servo sector 306 may be divided into a number of data sectors or LBAs for storing data along the length of the track 304. Data may be recorded to the data sectors of the tracks by a writer element of a head 310 (sometimes called a write head or transducer) that can generate a magnetic field to change values of bits stored within the data sectors.

Specific data or locations on a disc 302 can be identified with a sector identification ("sector ID") or sector number, and a track identification ("track ID") or track address. This sector ID and track ID can be part of the servo data used to position an arm 312 having the read/write head 310 over a target track 304 of the disc 302. A section 308 (sometimes called a servo spoke) of each servo sector 306 may be devoted to store servo data, while the remainder of the servo wedge 306 may be used to store other data, such as user or system data. Similarly, each data sector may include servo data used for fine head positioning over the center of the target track, such as servo burst patterns. During operation, as the disc 302 spins, the head 310 can read the servo data 308 and use such data to move the arm 312 to position the head 310 over specific tracks 304. The data storage device may then read or write data to the target track 304 via the head 310.

During a read or write (read/write seek) operation, head 310 can follow along a path corresponding to a selected track 304 to read or write data from or to the selected track 304. During a write operation, a write element of the head 310 can generate a magnetic field to write data to a track. In some circumstances, the magnetic field can affect data sectors beyond the selected track the data is supposed to be written to, thus causing magnetic interference with data sectors of adjacent tracks. This is often referred to as adjacent track interference (ATI). ATI generally occurs when a particular track on a disc 302 is written a large number of times without the adjacent track(s) being written, which the magnetic flux interference on the adjacent track(s) can cause errors or corruption in the adjacent track(s).

Figure 4:
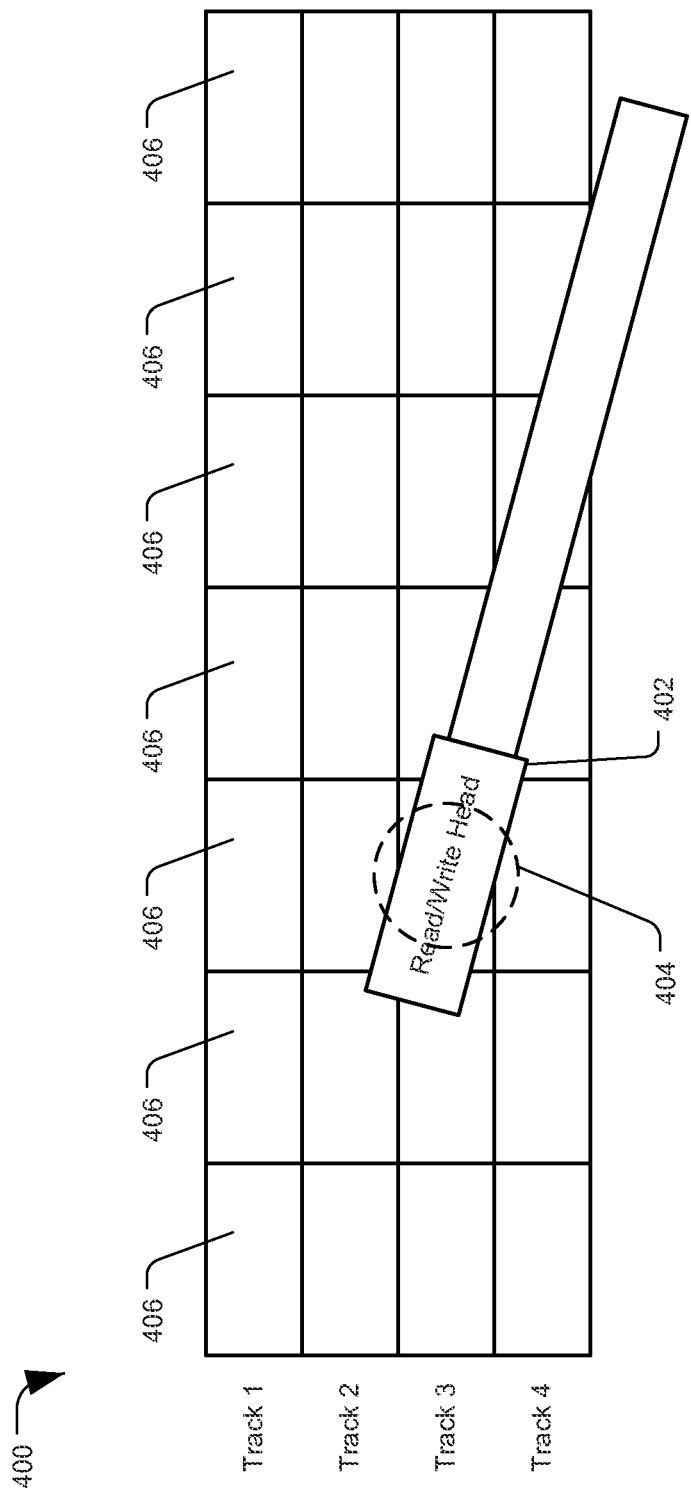
FIG. 4 is a diagram of a system for data storage device optimization based on adjacent track interference, in accordance with certain embodiments of the present disclosure.

Referring to FIG. 4, a diagram of a system for data storage device optimization based on adjacent track interference is shown and generally designated 300, in accordance with certain embodiments of the present disclosure. System 400 may be part of system 300, system 200, or system 100. FIG. 4 depicts a portion of four consecutive tracks, labeled Track 1 through Track 4. Each track may include a plurality of data sectors 406, each of which may be used to store data. A read-write head 402 may be used to read data from and store data to the sectors 406. For example, head 402, as depicted, is positioned over track 2 to perform a write or read (or both) operation.

As disc drive areal density increases, achieving the desired data reliability at a desired spacing becomes more challenging due to encroachment of a magnetic field 404 created by the writer element in the head 402. The magnetic field 404 may be used to record data to the sectors 406 by changing the magnetic charge of the magnetic material within the area of the sector. However, due to imperfections in the write head, high track densities on a disc, or other factors, the magnetic field 404 may extend beyond the track being written to influence proximate tracks (e.g. track 2 and track 4). Areas proximate to write location may be areas influenced or degraded by a nearby write operation, thus causing ATI.

When a drive performs repeated writes to the same track, the stray field generated by write field imperfections may result in errors, such as a gradual erasure of nearby tracks, due to effects such as adjacent track interference (ATI) or side track erasure (STE). ATI may refer to the stray field 404 of a write head 402 affecting tracks adjacent to the target write track. STE may refer to flaws in the write head's 402 shape causing erasure to more distant tracks. For example, even though the magnetic field 404 is depicted as a circle, in some embodiments the field 404 may take different shapes and have different influences on nearby tracks. In order to mitigate these erasure effects, tracks can be periodically refreshed (e.g. rewritten) and settings of the DSD can be modified to help mitigate the ATI and erasure effects.

For example, a drive may maintain a count, sometimes called a DOS count or counter, for an area of a disc representing an amount of influence from nearby writes that the area has been exposed to. The DOS count may be based on a number of writes for the corresponding area. For example, the drive may maintain a count for each track, for a section of a track, for a group of tracks, for zones of the disc (such as an ID zone or an OD zone), other areas, or any combination thereof.

Refreshing (e.g. rewriting or moving data located on) a track (or an area) can alleviate the effects of ATI and can be accomplished by performing a directed offline scan (DOS), or similar error detection and correction operation, on the track once the DOS count for that area exceeds a threshold amount. A DOS operation may involve reading the track, for example with a reader element of the head 402, using a lower error correction tolerance than during normal read operations. When data is read during normal read operations, some specified number of errors can be detected and corrected. For example, a number of errors which may be corrected may depend on the type of error correction codes and algorithms employed. An error tolerance may indicate a number of acceptable errors which can be corrected. By reading tracks using a lower error tolerance, degradation of the data on a track can be detected before the data becomes unreadable at the normal error correction tolerance.

If the track is still readable with the lower tolerance, the data quality for the track may not have degraded enough to warrant rewriting. If the track produces errors exceeding the lower error tolerance, the DOS may involve reading the track and applying the higher ability error correction techniques, then rewriting the track to refresh the data quality. Thus, a device can benefit from an informed determination when setting of the lower error tolerance (i.e. a threshold) to trigger the DOS.

For example, a drive may select the lower error tolerance based on a determined BER of an adjacent track. The BER of an adjacent track may be determined by one or more of the processes described herein. For example, a drive may seek to a first adjacent track ("N+1") (such as track 3) adjacent to the target track ("N", such as track 2), and then seek back to the target track and write the target track. The drive may then seek to a second adjacent track ("N−1") (such as track 1) also adjacent to the target track, and then seek back to the target track and write the target track. Seeking to each of the adjacent tracks, tracks 1 and 3, and seeking back and writing the target track can alternately repeat for a number of writes (e.g. hundreds of writes). The BER of at least one of the adjacent tracks, such as track 1 or track 3, can then be determined and a lower error tolerance threshold can be selected based on the determined BER. The DOS operation can then be configured to trigger a refresh operation based on the lower error tolerance threshold.

Figure 5:
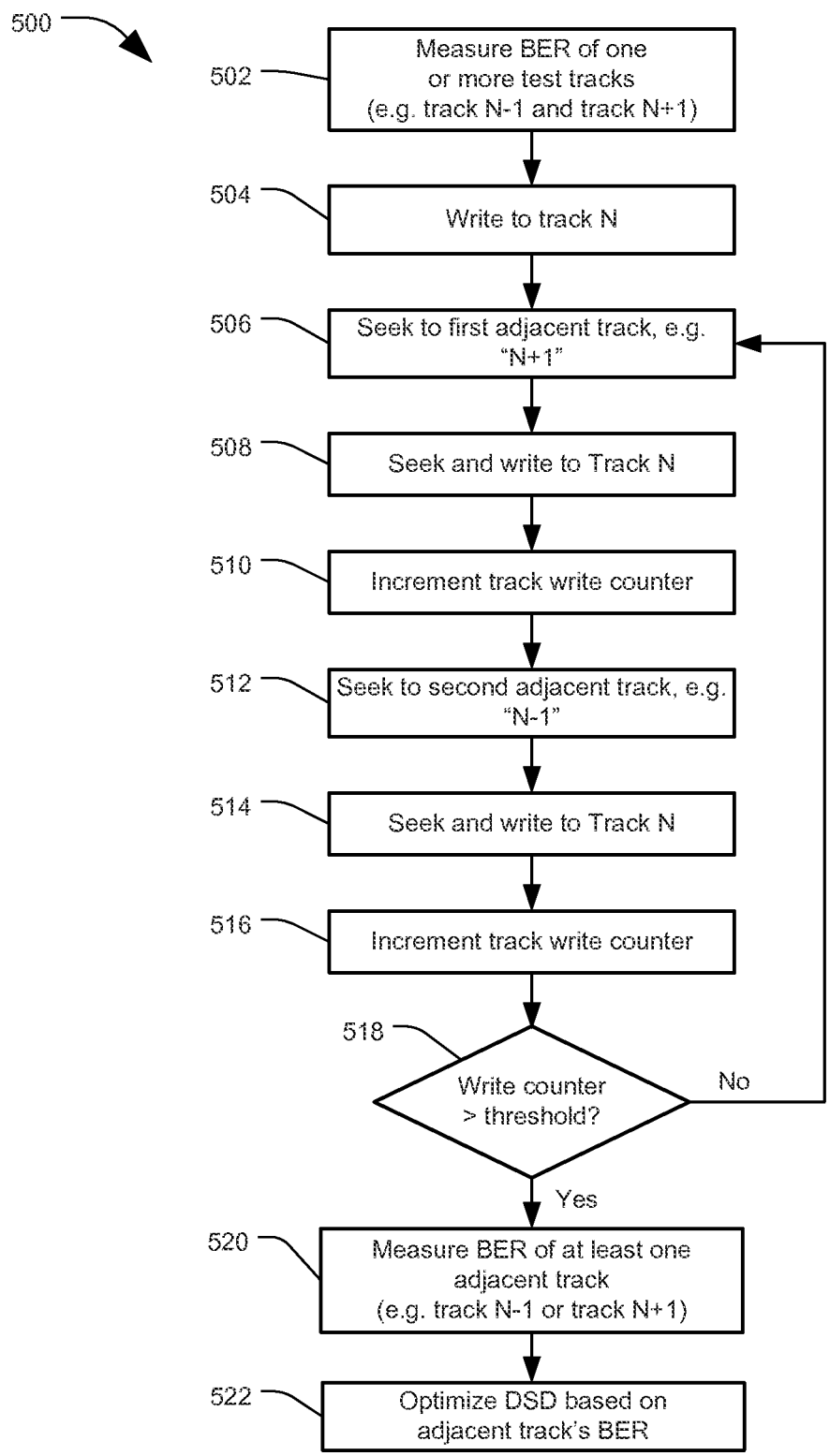
FIG. 5 is a flowchart of a process for data storage device optimization based on adjacent track interference, in accordance with certain embodiments of the present disclosure.

Referring to FIG. 5, a process for data storage device optimization based on adjacent track interference is disclosed and generally labeled 500, in accordance with certain embodiments of the present disclosure. The process 500 may be implemented by a DSD, such as DSD 240, or may be implemented by a disc test device, such as test device 102. The process 500 may be implemented to perform a calibration or certification process as described herein to test ATI and to configure one or more settings of a DSD based on the test results.

The process 500 can include measuring a bit error rate (BER) of one or more test tracks, such as first adjacent track N+1 and a second adjacent track N−1 both adjacent to target track N, at 502. The process may then perform a write, at 504, though this step is optional, as the repeating part of the process (506 to 518) could be performed without the first write to the target track.

The process 500 may seek to the first adjacent track, at 506. Then, the process 500 can seek to the target track and write the target track, at 508. A track write counter may be incremented after the write to the target track, at 510. Then, the process 500 may seek to a second adjacent track, at 512. Then, the process 500 can seek to the target track and write the target track, at 514. The track write counter may be incremented after the write to the target track, at 516. The seek operations described in this detailed description may be anticipatory track seeks (ATS) (i.e. seeks utilizing less than all of the available servo wedges to perform the seek, resulting in a faster seek time than a normal seek.), though they could also be performed utilizing normal seeks.

The process 500 can also include determining if the write count, as determined from the track write counter, is greater than (or equal to) a threshold, at 518. The threshold may be pre-selected or may be dynamically selected based on a detected BER. If the write count is less than the threshold, the process 500 may repeat steps 506 to 518. If the write count is greater than the threshold the process may proceed to setting configuration of a DSD based on process 500. As used herein, a seek includes positioning a write head relative to a selected track, though a seek does not include writing to the selected track. Any of the seek operations described herein, whether to an adjacent track or to a target track may include a LBC process performed while the write head is performing the seek. For example, an LBC process may only need an amount of time approximately equivalent to five servo sectors being passed, where an ATS may take twelve servo sectors to perform the seek.

After the target track has been written a selected number of times, the BER of one or more (or other adjacent tracks, such as N+2, N−2, N+3, N−3, and so on) of the adjacent tracks can be determined, at 520, and a DSD corresponding to the tested disc may have settings configured based on the determined BER, at 522. For example, a lower DOS threshold can be selected based on the determined BER. A lower DOS threshold can be selected for each zone of a disc, where a disc surface includes multiple zones, and each zone includes multiple tracks. A lower DOS threshold can also be selected for each zone and head combination, where there may be multiple disc surfaces in a single DSD, as discussed more with respect to FIG. 6. For example, if the BER is within one of multiple pre-determined ranges of BER, the process 500 may select a specific DOS threshold that corresponds to the pre-determined range.

Figure 6:
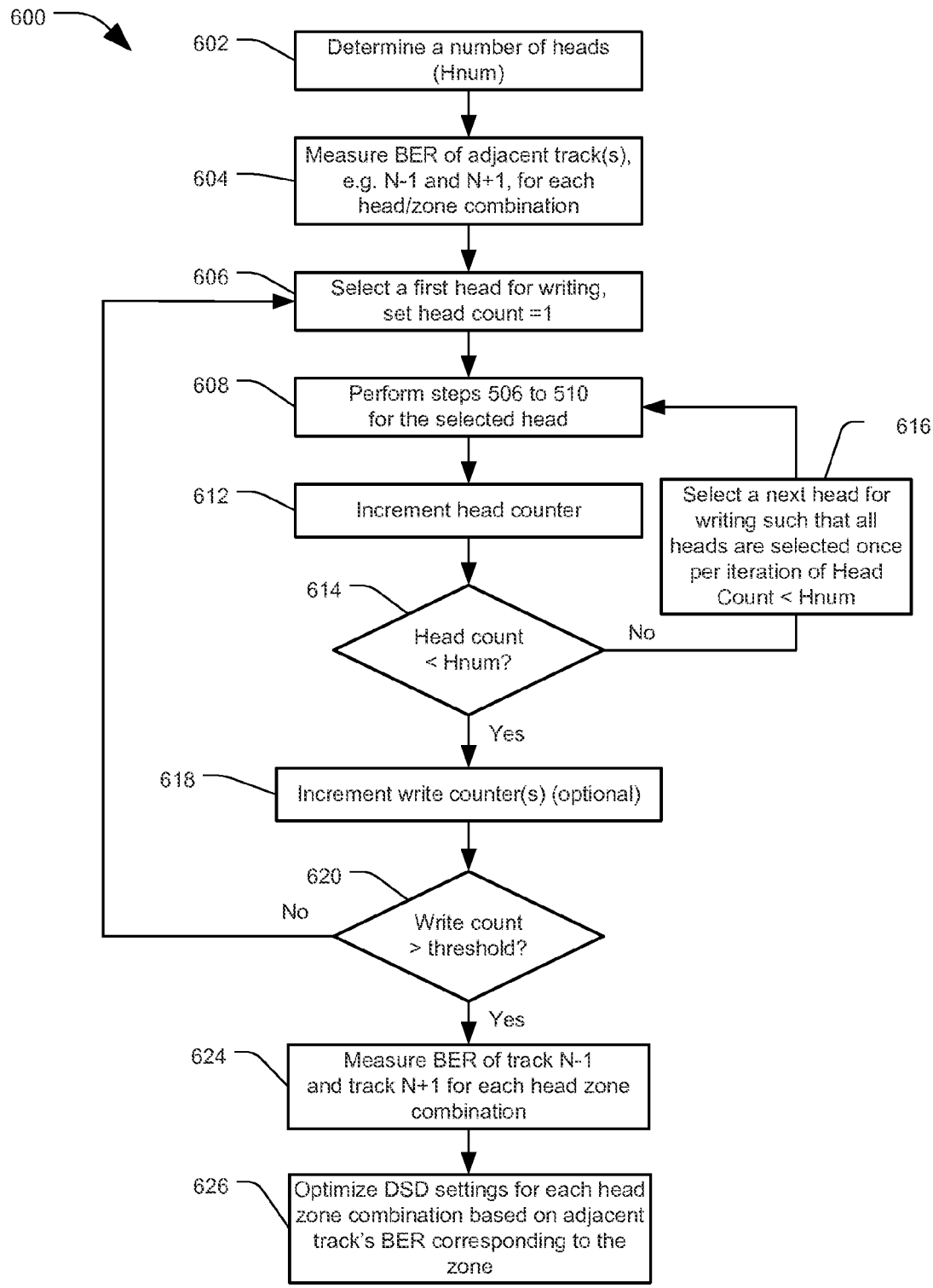
FIG. 6 is a flowchart of a process for data storage device optimization based on adjacent track interference, in accordance with certain embodiments of the present disclosure.

Referring to FIG. 6, a process for data storage device optimization based on adjacent track interference is disclosed and generally labeled 600, in accordance with certain embodiments of the present disclosure. The process 600 may be implemented by a DSD, such as DSD 240, or may be implemented by a disc test device, such as test device 102. The process 600 may be implemented to perform a calibration or certification process as described herein to test ATI and to configure one or more settings of a DSD based on the test results. Specifically, the process 600 can be implemented in a DSD having multiple heads and multiple disc surfaces.

The process 600 can include determining a number of heads in the DSD, at 602. The number of heads value may be stored in a memory accessible to the firmware of the controller or may be determined by checking settings of the preamplifier(s), such as a number of output lines. Then, the process 600 may then measure a bit error rate (BER) of one or more test tracks, such as first adjacent track N+1 and a second adjacent track N−1 both adjacent to target track N, for each head and zone combination, at 604. The process 600 may then select a head for writing and set a head counter to a value of one, at 606. Then, the process 600 can perform steps 506 to 510 as described with respect to FIG. 5, at 608. However, other variations such as performing steps 506 to 516 at 608 are possible. Each seek described herein may be an ATS seek or a normal seek. For example, if head switching is utilized after each write, a normal seek may be utilized during the process; whereas, if head switching is used after every 2 or more writes, seeks with the same head may be done with ATS seeks while the head switching seeks may be normal seeks.

Once the adjacent tracks have each been seeked to once and the target track written twice, at 608, the process 600 can increment a head counter, at 612, and determine if the head counter value is less than the number of heads in the DSD (Hnum), at 614. If the head counter value is less than Hnum, the process 600 may select a next head for writing such that all heads are selected once per iteration of the head counter value less than Hnum, at 616. When the head counter value is equal to (or greater than somehow) than Hnum, the process 600 may optionally increment a write counter, at 618. Though, step 620 may not be necessary if the write counters from steps 506 to 516 are used.

The process 600 can also include determining if the write count is greater than (or equal to) a threshold, at 620. The threshold may be pre-selected or may be dynamically selected based on a detected BER. If the write count is less than the threshold, the process 600 may repeat steps 606 to 620. If the write count is greater than the threshold the process may proceed to setting configuration of a DSD.

After the target track for each zone has been written a selected number of times, the BER of one or more (or other adjacent tracks, such as N+2, N−2, N+3, N−3, and so on) of the adjacent tracks for each head zone combination can be determined, at 624, and a DSD settings to the tested disc may have settings configured for each head zone combination based on the determined BER, at 626. For example, a lower DOS threshold can be selected based on the determined BER.

Figure 7:
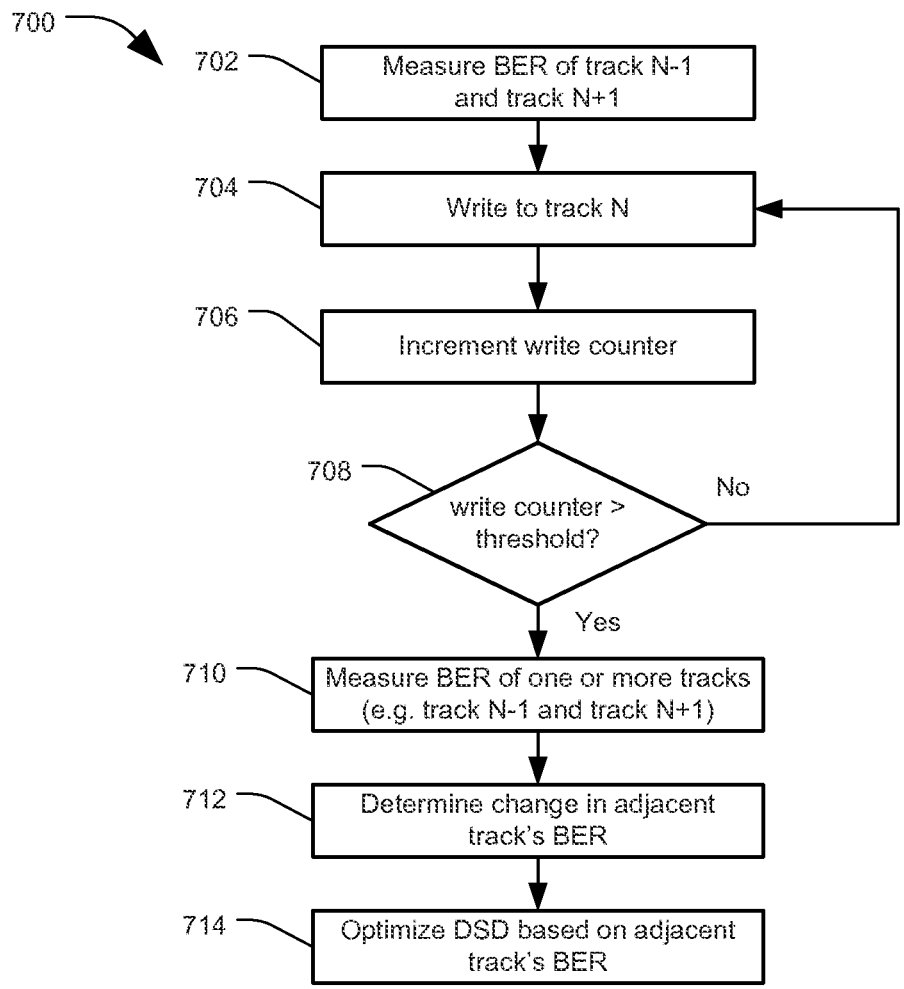
FIG. 7 is a flowchart of a process for data storage device optimization based on adjacent track interference, in accordance with certain embodiments of the present disclosure.

Referring to FIG. 7, a process for data storage device optimization based on adjacent track interference is disclosed and generally labeled 700, in accordance with certain embodiments of the present disclosure. The process 700 may be implemented by a DSD, such as DSD 240, or may be implemented by a disc test device, such as test device 102. The process 700 may be implemented to perform a calibration or certification process as described herein to test ATI and to configure one or more settings of a DSD based on the test results.

The process 700 may be a simplified version of an ATI test process and can include measuring a bit error rate (BER) of one or more test tracks, such as first adjacent track N+1 and a second adjacent track N−1 both adjacent to target track N, at 702. The process may then perform a write to the target track N, at 704. A track write counter may be incremented after the write to the target track, at 706. The process 700 can also include determining if the write count, as determined from the track write counter, is greater than (or equal to) a threshold, at 708. The threshold may be pre-selected or may be dynamically selected based on a detected BER. If the write count is less than the threshold, the process 700 may repeat steps 704 to 708. If the write count is greater than the threshold, the process 700 may proceed to configuring one or more settings of a DSD based on process 500.

After the target track has been written a number of times, the BER of one or more of the adjacent tracks (or other adjacent tracks, such as N+2, N−2, N+3, N−3, and so on) can be determined, at 710. The process can, optionally, include determining a change (i.e. difference) in BER from the first measurement done at 702 and the second measurement done at 710, at 712. The process 700 may adjust settings for a DSD corresponding to the tested disc based on the determined BER, at 714. For example, a lower DOS error threshold can be selected based on the determined BER. A lower DOS error threshold can be selected for each zone of a disc, where a disc surface includes multiple zones, and each zone includes multiple tracks. A lower DOS error threshold can also be selected for each zone and head combination, where there may be multiple disc surfaces in a single DSD, such as discussed with respect to FIG. 6.

Figure 8:
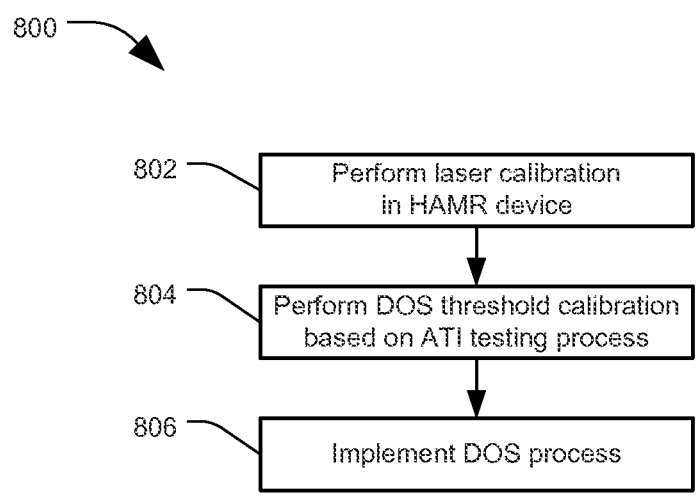
FIG. 8 is a flowchart of a process for data storage device optimization based on adjacent track interference, in accordance with certain embodiments of the present disclosure.

Referring to FIG. 8, a process for data storage device optimization based on adjacent track interference is disclosed and generally labeled 800, in accordance with certain embodiments of the present disclosure. The process 800 may be implemented by a DSD, such as DSD 240, or may be implemented by a disc test device, such as test device 102. The process 800 may be implemented to perform a calibration or certification process as described herein to test ATI and to configure one or more settings of a DSD based on the test results.

The process 800 may include performing a laser calibration in a HAMR device, at 802, to obtain a recently optimized laser current. The process 800 may then perform one or more of the processes described herein to obtain a DOS threshold calibration, at 804. The DOS threshold calibration can be performed to minize ATI with the recently optimized laser current. For example, a lower error tolerance threshold can be selected based on the results of the DOS threshold calibration. The DOS process, including the optimized lower error tolerance threshold, can be implemented in a DSD, at 806.

The processes and functions described herein are not limited to factory calibration and can be employed in the field during customer testing or use. While the processes described here discuss selecting a lower error tolerance threshold that can be used during a DOS process, the processes can also be used to determine a trigger to initiate performing a DOS process. For example, a DOS process may be triggered by a process that compares an adjacent track write counter to a write count threshold, which can be set based on the DSD optimization processes described herein. Further, while certain embodiments described herein discuss seeking to adjacent tracks, other tracks could be selected to seek to, and some embodiments may vary which tracks they seek to instead od seeking to just one or two tracks repeatedly.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments.

Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a write head adapted to write multiple data tracks of a data storage disc;
    a controller coupled to the write head and configured to perform a calibration process including:
        seeking the write head to an adjacent track of a target track;
        after the seek to the adjacent track, seeking the write head to the target track and writing the target track;
        repeating seeking to an adjacent track and writing the target track until a threshold number of writes to the target track have been reached;
        after the threshold number of writes are reached, measuring an error rate of an adjacent track; and
        determining a setting corresponding to the data storage disc based on the error rate.

2. The apparatus of claim 1 further comprising the calibration process includes determining a bit error rate based on the measured error rate.

3. The apparatus of claim 1 further comprising the calibration process includes:
    determining a first bit error rate of an adjacent track before the calibration process;
    determining a second bit error rate of an adjacent track after the threshold number of writes are met;
    determining a difference between the first bit error rate and the second bit error rate; and
    determining the setting based on the difference.

4. The apparatus of claim 1 further comprising the setting includes a threshold to initiate a directed offline scan based on the measured error rate.

5. The apparatus of claim 1 further comprising:
    the apparatus includes a heat assisted magnetic recording device; and
    the controller configured to:
        determine a laser calibration has occurred; and
        initiate the calibration process based on the laser calibration.

6. The apparatus of claim 1 further comprising:
    multiple data storage discs;
    multiple write heads corresponding to the multiple data discs; and
    the controller configured to:
        perform the calibration process for each head and zone combination on the multiple data discs.

7. The apparatus of claim 1 further comprising:
    the data storage disc is a magnetic disc;
    a laser coupled to the write head; and
    a control circuit coupled to the laser and adapted to perform laser bias control during a seek of the calibration process.

8. The apparatus of claim 1 further comprising seeking to an adjacent track includes performing an anticipatory track seek (ATS).

9. The apparatus of claim 1 further comprising the apparatus is adapted to perform the calibration process as part of a manufacturing certification process.

10. A device comprising:
    a circuit adapted to couple to a write head corresponding to a data storage medium having multiple tracks for data storage, the circuit configured to perform a calibration process corresponding to the data storage medium including:
        seeking to an adjacent track adjacent to a target track;
        seeking to the target track;
        writing the target track;
        repeating seeking to the adjacent track, seeking to the target track, and writing the target track until a threshold number of writes are met; and
        after the threshold number of writes are met, measuring an error rate of the adjacent track; and
        determining an adjacent track interference threshold corresponding to the data storage medium based on the error rate.

11. The device of claim 10 further comprising the calibration process including:
    the adjacent track is a first adjacent track on a first side of the target track and a second adjacent track is on a second side, opposite the first side, to the target track; and
    alternatingly repeating (1) seeking to the first adjacent track, seeking to the target track, and writing the target track, and (2) seeking to the second adjacent track, seeking to the target track, and writing the target track, until the threshold number of writes to the target track are met.

12. The device of claim 10 further comprising the determining the adjacent track interference threshold includes setting a threshold to initiate a directed offline scan based on the measured error rate.

13. The device of claim 10 further comprising the determining the adjacent track interference threshold includes setting an error tolerance threshold to be utilized by a directed offline scan (DOS) process based on the measured error rate.

14. The device of claim 10 further comprising seeking to the adjacent track and seeking to the target track both include performing an anticipatory track seek (ATS).

15. A memory device storing instructions that, when executed, cause a processor to perform a method comprising:
    performing a target track write process including:
        seeking a write head of a data storage device to an adjacent track to a target track;
        seeking the write head to the target track;
        writing the target track;
    repeating the target track write process until the target track has been written a number of times; and
    after the target track has been written a number of times, determining a configuration of the data storage device based on a measurement of the adjacent track.

16. The memory device of claim 15 further comprising the method including:
    the target track write process includes:
        seeking to a first adjacent track, seeking to the target track, and writing the target track, where the first adjacent track adjacent the target track on a first side of the target track; and
        seeking to a second adjacent track, seeking to the target track, and writing the target track, where the second adjacent track is adjacent the target track on a second side of the target track.

17. The memory device of claim 15 further comprising the method including:
   determining a first bit error rate of an adjacent track before a first iteration of the seeking and the writing;
   determining a second bit error rate of an adjacent track after the target track has been written the number of times;
   determining a difference between the first bit error rate and the second bit error rate; and
   determining the configuration includes determining a setting for a directed offline scan (DOS) based on the difference.

18. The memory device of claim 17 further comprising the setting for the directed offline scan includes at least one of (1) a threshold to initiate a directed offline scan (DOS), and (2) a DOS error tolerance threshold which initiates a re-write of a data track if the error tolerance threshold is exceeded.

19. The memory device of claim 18 further comprising the method including:
   monitoring a number of writes to a selected track; and
   performing the DOS when the number of writes exceeds a threshold number.

20. The memory device of claim 15 further comprising the memory device is a data storage device configured to perform the method as part of a device calibration that can be performed as part of a manufacturing certification process and can be performed after a manufacturer has shipped the data storage device.

* * * * *